2,708,192

METHOD OF MAKING ADHESIVE COMPOSITION CONTAINING A DIENE RUBBER AND A PHENOLIC RESIN

Edwin O. Joesting, Mounds View Township, Ramsey County, and Dolores O. Ethier, White Bear Township, Ramsey County, Minn., assignors to Minnesota Mining & Manufacturing Company, St. Paul, Minn., a corporation of Delaware No Drawing. Application May 21, 1952, Serial No. 289,198

9 Claims. (Cl. 117—122)

This invention relates to adhesive compositions and to methods of making the same. While the invention is not restricted thereto, it has particular reference to pressure-sensitive adhesives as used on pressure-sensitive adhesive tapes. Most particularly, the invention relates to pressure-sensitive tape adhesives which remain firm and tacky at relatively high temperatures of the order of 250–400° F.

Pressure-sensitive adhesives and adhesive-coated masking tapes and the like are well-known. These products commonly contain natural rubber and a thermoplastic tackifier resin compatible therewith. The adhesive, coated on a flexible backing, is aggressively tacky at normal room temperatures. It has the required four-fold balance of adhesion, cohesion, stretchiness and elasticity, permitting the tape to be aggressively and stably tacky and yet capable of being stripped back from smooth non-fibrous surfaces to which temporarily applied without delamination or offsetting. It is ready to use at any time, requiring no moistening or heating, and adheres instantly and tightly to surfaces against which it is pressed.

At higher temperatures the balance of properties in many such adhesive masses is upset, with the result that delamination and offsetting of the adhesive coating is experienced. Attempts have previously been made to partially vulcanize or cure the rubber component, or to employ tackifier resins having much higher melting points, or in other ways to increase the high-temperature cohesive strength of the adhesive mass. In all such prior attempts, either the aggressive tackiness of the adhesive has been reduced or destroyed during vulcanization or on further storage; or the adhesiveness of the tape product is lost on subsequent heating so that the tape cannot be re-used; or the adhesive reverts or softens on heating; or some other deficiency is encountered in making or storing or using the adhesive tape.

It is therefore a salient object of the present invention to provide a pressure-sensitive adhesive which avoids these and other deficiencies of prior art adhesives, which in the form of an adhesive coating on a tape backing is aggressively tacky at normal room temperatures and retains its tackiness when subjected to elevated temperatures of the order of 250–400° F. without softening to the point of delaminating or offsetting on stripping of the tape from surfaces to which temporarily applied. It is also an object of the invention to provide a method of making rubber-base adhesives having improved heat-resistance. Other objects will be apparent or will be pointed out as the description proceeds.

Our novel adhesive masses comprise a rubbery base which has been cured and toughened by a heat reaction with a compatible heat-advancing phenol-aldehyde resin and which is then rendered applicable for use as an adhesive by mastication in the presence of a tackifier resin, all as hereinafter more specifically described and illustrated.

Prior art vulcanized pressure-sensitive adhesives and adhesive tapes have been made by a variety of methods. In one method, vulcanizing agents are added to the adhesive mass by milling or mixing, the mass is coated on a suitable backing, and the coated sheet or tape then subjected to controlled heating. In another method, the vulcanizing components are added to the adhesive and the mass heated prior to coating. Since the pressure-sensitive adhesive must remain aggressively tacky, these methods attempt to employ such small amounts of curing agents, or such limited degrees of heating, as will produce the desired toughening effect without substantially reducing the tackiness. Vulcanization prior to coating also requires that the mass be cured only to a point at which it is still coatable. With very small amounts of curing agent, uniformity is difficult to attain, and portions of the batch frequently then remain uncured and highly susceptible to softening at elevated temperatures. Increasing the amount of curing agent and reducing the time and temperature of cure provides a more uniform but incomplete cure, so that small quantities of unreacted curing agent remain. Subsequent prolonged aging at room temperature, or exposure for brief periods to higher temperatures, then causes tack loss through continued reaction. More extensive curing of formulas containing higher proportions of tackifiers results in resinuous adhesive masses which are highly elastic and are difficult to apply as a smooth coating on the tape backing.

We avoid these and other difficulties by completely reacting our reactive mixture of vulcanizable rubbery polymer and compatible heat-advancing phenol-aldehyde resin at elevated temperature without concurrent mixing and by then physically working or masticating the cured mass until the desired combination of properties is attained. Surprisingly, the adhesive at this point is completely stable to further heating, since it neither softens to a pasty, plastic state nor loses tackiness, when further heated in coated tape form.

In probable explanation of these properties and results, the following is suggested. Since the reaction is carried to completion, no unreacted components remain in the completed adhesive to cause subsequent loss of tackiness or other change in properties during subsequent natural aging or under conditions of elevated temperature. The extensive curing of the polymer obtained by this procedure assures the reaction of all portions of the rubber to a state wherein they no longer become plastic at elevated temperatures. The further mechanical masticating of the mass selectively degrades the most highly cured portions, thus reducing them to fragments having approximately the size of the less highly cured and still adhesive portions, and providing a mixture which is adhesive, highly homogeneous, and also high in internal strength or cohesiveness.

In any event, and regardles of theory, our adhesive masses are stable to heating and have a high degree of adhesiveness; and our pressure-sensitive adhesives and adhesive tapes in particular, made in accordance with the above-described principles, have been shown to be permanently aggressively tacky and to be free of delamination and offsetting at temperatures up to at least about 250° F., and in many cases 400° F. or even higher.

Examples of specific formulas and procedures applicable to the practice of our invention will now be given, without, however, any intent of limiting the invention thereto. Proportions are given in parts by weight unless otherwise specified.

*Example 1*

Rubbery butadiene-styrene copolymer ("GR–S")___ 100
Zinc oxide_____ 20
Lecithin (may be omitted)_____ 2.5
Tackifier resin ("Pentalyn H")_____ 10
Phenol-aldehyde resin_____ 5

The lecithin reduces the stickiness of the batch on the mill without substantially reducing the tackiness of the completed adhesive and hence is an aid in the processing on the mill; but equally good adhesives may be made in the absence of this ingredient.

"Pentalyn H" the pentaerythritol ester of hydrogenated rosin, melting at 93° C., is a typical highly effective tackifier resin which is compatible with the rubbery polymer and has a low acid number.

The phenol-aldehyde resin is of the type known as "oil-soluble heat-advancing." It is soluble in drying oils, compatible with the rubbery polymer, solid at room temperature, melts to a liquid when first heated, and on continued heating reacts to a hard infusible state. Such resins are commonly made by reacting together formaldehyde and substituted phenols such as para-tertiary-butyl phenol, para-tertiary-amyl phenol, or para-phenyl phenol, using an alkaline catalyst and more than an equimolecular proportion of aldehyde. "Bakelite BR–14634" is a specific commercial example of such resins, melting at about 100° C. and which has been successfully employed by us in carrying out the principles of our invention. It is understood to be a para-tertiary-butyl-phenol formaldehyde resin made with an alkaline catalyst and with more than one mol, i. e. between 1.5 and 2.0 mols, of formaldehyde for each mol of substituted phenol.

The rubbery polymer was first warmed up on a rubber mill, and the remainder of the ingredients added on the mill. A soft, tacky adhesive mass resulted. This mass was placed in an autoclave and cured by heating for three hours under 30 lb. steam pressure. The cooled mass was firm and elastic, and only slightly tacky. It was then returned to the rubber mill and milled with the mill rolls set at a minimum distance apart so as to obtain maximum breakdown of the rubbery mass. Milling under these conditions for six minutes homogenized and softened the mass just beyond the point at which it first formed a smooth thin layer on the mill rolls. The batch was then dispersed in 400 parts of heptane containing 10 parts of alcohol as a viscosity-reducing agent. An additional 37 parts of "Pentalyn H" tackifier resin was blended into the solution.

The mass was coated on a unified paper backing and dried. The coated sheet was slit into narrow widths and wound up as rolls of pressure-sensitive adhesive tape.

The tape was tested for temperature resistance by adhering it to a metal panel, heating the assembly to 250° F., and then slowly stripping the tape away at that temperature. The adhesive did not delaminate or offset to the panel. In another test, the tape was permitted to remain on the panel for several hours before stripping. After removal, the adhesive surface was still aggressively tacky.

In a modification of the above example, both the lecithin and the tackifier resin are omitted during the mixing and heating steps. The resulting batch does not cling together on the mill or in a heavy-duty internal mixer and hence cannot by itself be suitably masticated. A small amount of the tackifier resin is therefore added to the mill or mixer and blended with the otherwise crumbly batch at this point, whereupon mastication proceeds and the batch soon becomes smooth, homogeneous, and capable of dispersion in heptane to form a coatable composition. When coated in this form, the adhesive is substantially non-tacky to the touch and to steel, glass and many other surfaces, and is not properly classified as a pressure-sensitive tape adhesive. Addition of further amounts of tackifier resin increases the tackiness, however, and the resulting composition when coated on a suitable flexible backing provides a high quality heat-resistant pressure-sensitive adhesive tape.

*Example 2*

Small amounts of sulfur-vulcanizing agents are preferably but not necessarily included when natural rubber is substituted in whole or in part for the synthetic rubbery polymer of Example 1.

Rubber (smoked sheets) _____ 100
Zinc oxide _____ 10
Tackifier resin _____ 10
Sulfur-vulcanizing agent ("Tetrone A") _____ 0.5
Phenol-aldehyde resin ("BR–14634") _____ 10

"Tetrone A" is dipentamethylene thiuram tetrasulfide.

The tackifier resin was "Piccolyte S–115," a pure hydrocarbon thermoplastic terpene resin melting at approximately 115° C. and having a zero acid number.

The rubber was warmed up and the other ingredients added on the mill, as in Example 1. The mixture was heated for three hours under 30 lb. per sq. in. steam pressure in an autoclave, and was then remilled for 10 minutes on a tight mill and with addition of 15 parts of "Piccolyte S–115." At this point the batch formed a smooth uniform layer over the mill roll, and a small portion could be smoothly dispersed in heptane by high-speed stirring with a "Lightnin" mixer. The milled batch was then dispersed in 500 parts of heptane containing 25 parts of "Piccolyte S–115" and 10 parts of ethyl alcohol. Coated on a unified fibrous backing and dried, the adhesive layer was aggressively tacky. The strip did not lose tackiness when heated at 400° F. for several hours on a metal panel. The sheet could be stripped from a hot panel at 250–300° F. without splitting of the adhesive layer.

*Example 3*

Rubber _____ 100
Zinc oxide _____ 10
Tackifier resin as in Example 2 _____ 10
Phenol-aldehyde resin as in Example 2 _____ 10
Sulfur-vulcanizing agent as in Example 2 _____ 0.75

The rubber and the remaining components were combined on the mill until smooth, heated under 30 lb. steam pressure in an autoclave for 3 hours, and re-milled on a tight mill for five minutes, with addition of a further 20 parts of the tackifier resin.

The milled adhesive was then dispersed in a solution consisting of:

Tackifier resin ("Piccolyte S–115") _____ 20
Heptane _____ 450
Alcohol _____ 10

The resulting adhesive composition was coated on suitable flexible backings to provide heat-resistant pressure-sensitive adhesive tapes.

The adhesive mass of this example was somewhat firmer than that of Example 2 and the coated tape was capable of withstanding even higher temperatures without loss of tackiness. The adhesive layer did not split or delaminate when the tape was stripped from a metal plate at 400° F. Tape products which are resistant to still higher temperatures, e. g. up to 500° F. or even 600° F., are possible provided suitable heat-resistant and oxygen-impervious backing materials are available and the adhesive can be effectively bonded thereto. One such backing material is anodized aluminum foil.

A further improvement in heat-resistance may be obtained when employing formulas such as those of Examples 2 and 3 by substituting rubbery butadiene-styrene copolymers, as used in Example 1, for part or all of the natural rubber, and substituting "Pentalyn H" tackifier resin for the "Piccolyte S–115."

In these formulas, zinc oxide or zinc resinate, or some other equivalent activator, is required to promote the curing reaction.

The amount of phenol-aldehyde resin has been effectively varied over the range of about 3 to about 15 parts of resin to 100 parts of rubbery polymer. At less than about three parts, the adhesive softens when heated to 250° F. Above about 15 parts of phenol-aldehyde resin, the initial tackiness of the adhesive is undesirably low, and cannot effectively be increased by prolonging the re-milling cycle or by increasing the amount of tackifier resins without at the same time decreasing the resistance of the adhesive to high temperatures.

As indicated by Example 1, the phenolic resin alone is effective in reacting with the rubber to provide, when suitably compounded, a heat-resistant adhesive product. While this is particularly true of butadiene-styrene rubbery copolymer base adhesives or of adhesives based on mixtures of butadiene-styrene rubber and other rubbery polymers, it is also true of adhesives based on natural rubber. However, the latter adhesives in particular are still further improved, especially as regards resistance to softening at elevated temperatures, by including small amounts of sulfur-vulcanizing agents such as dipentamethylene thiuram tetrasulfide, as shown by Examples 2 and 3. Other sulfur vulcanizing materials, including combinations of organic or inorganic accelerators with small amounts of free sulfur, may be used; but for convenience in handling the small amounts required we prefer to use "Tetrone A" or the like, and in amounts not exceeding about 1.5 parts based on 100 parts of vulcanizable rubbery polymer.

Several specific tackifier resins have been indicated, and many others are known, which are effective in these compositions. Such resins must be compatible with the rubbery component and should be relatively high in melting point and low in acid number. The total amount of resin in the final composition depends to some extent on the degree of tackiness desired, and may vary from the minimum amount required during mastication of the cured base up to at least about 70 parts based on 100 parts of rubbery polymer. Pressure-sensitivity is not attained with amounts of tackifier resins less than about 30 parts, and best results with respect to pressure-sensitive adhesives are obtained at about 45–65 parts. However we have made adhesives which, while not pressure-sensitive, were still highly useful for adherence to specific surfaces such as that of anodized aluminum panels, by employing as low as 5 parts of tackifier resin with a "GR–S" base, or 10 parts with a natural rubber base, the resin being added prior to heat-curing. On the other hand, addition of more than about 40 parts of resin to a rubber base (or about half that amount to a "GR–S" base) on the mill prior to heating makes the batch too sticky and soft to be handled effectively, and may also reduce the heat-resistance of the final adhesive product.

Combinations of two or more tackifier resins may be used in place of a single resin. With less efficient tackifier resins, somewhat larger amounts must be employed than are indicated hereinabove.

It will be understood, in view of what has already been said, that our adhesives may be applied to other sheet materials, e. g. cloth, transparent non-fibrous cellulosic films, and flexible metal foils, as well as to impregnated or otherwise unified fibrous webs, and that coating by calendering of the dry adhesive is equally as effective as coating or spreading from solution—i. e., from dispersion in a volatile liquid vehicle—as has been specifically described in the examples.

Example 1 describes an adhesive employing only a phenol-aldehyde resin as the curing agent, whereas Examples 2 and 3 employ both a phenol-aldehyde resin and a sulfur-vulcanizing agent. We have also attempted to make high-temperature-resistant adhesives by our procedure with sulfur-vulcanizing agents providing the sole curing means. Surprisingly, however, we have found that such adhesives do not provide the advantageous combination of properties obtainable with the compositions herein described. For example, adhesives in which the sole curing agent is a sulfur-vulcanizing agent may be adequately aggressively tacky at normal room temperatures, but surprisingly lose a considerable proportion of such aggressive tackiness when applied or used at elevated temperatures. We have also observed that pressure-sensitive adhesive tapes produced in accordance with our invention as herein described, by reaction with a phenol-aldehyde resin, and with or without a sulfur-vulcanizing agent, are essentially non-staining when applied to white lacquered panels, whereas adhesives cured with sulfur-vulcanizing agents in the absence of the phenol-aldehyde resin have produced unattractive stains on such panels.

The time and temperature of heating must be sufficient to cause essentially complete reaction between the several reactive components; i. e., so that further heating causes no additional toughening of the mass as determined by its resistance to subsequent milling or homogenization. In the above examples, three hours at 30 lbs. steam pressure is specified, but two hours at the indicated temperature is adequate, the additional hour serving as a safety factor. Shorter times at higher temperatures as well as longer times at somewhat lower temperatures have produced fully equivalent results. The temperature must obviously be high enough to initiate the reaction and carry it to completion within a reasonable time. The volume of the material to be heated has an effect on the heating cycle, less total time being required for small quantities of the adhesive mass which quickly attain the required temperature than for larger unit quantities. Heating under pressure, while not essential, helps to ensure rapid uniform heating of the entire mass and also helps to prevent "blowing" or "sponging" of the mass, thus assisting in the subsequent milling or homogenizing action. Heating in molds or between platens is similarly effective.

Other methods and means of blending or combining the reactants, of heating and curing the mass, of masticating and homogenizing the cured material, of introducing the required tackifier resins and other desired ingredients such as pigments, fillers, etc., will become apparent in view of the principles herein disclosed and elucidated.

What we claim is as follows:

1. The method of making an adhesive composition which comprises the steps of: (1) blending together a vulcanizable rubbery diene polymer and an oil-soluble, heat-advancing, phenol-aldehyde resin compatible therewith; (2) heating the blend without concurrent mixing until completion of the reaction; and (3) masticating the mixture in the presence of a small amount of admixed compatible tackifier resin until the mass is smoothly dispersible in heptane.

2. A stable heat-resistant adhesive composition prepared in accordance with the method of claim 1.

3. An adhesive sheet material comprising a thin flexible backing and, firmly adherently bonded thereto, a coating of a stable, heat-resistant adhesive composition prepared in accordance with the method of claim 1.

4. The method of making a pressure-sensitive tape adhesive composition which comprises: (1) blending together 100 parts of a vulcanizable rubbery diene polymer and about 3–15 parts of an oil-soluble, heat-advancing, phenol-aldehyde resin compatible therewith; (2) heating the blend, in the absence of concurrent mixing, until completion of the reaction; (3) masticating the mixture in the presence of an amount of a tackifier resin sufficient to cause the batch to cling together for effective mastication, and within the range of about 5–40 parts, until the mass is smoothly dispersible in heptane, and (4) adding further tackifier resin to a total of about 45–65 parts.

5. A stable, heat-resistant, pressure-sensitive tape adhesive composition prepared in accordance with the method of claim 4.

6. A pressure-sensitive adhesive tape comprising a thin flexible backing and, firmly adherently bonded thereto, a coating of a stable, heat-resistant adhesive composition prepared in accordance with the method of claim 4.

7. The method of making a pressure-sensitive tape adhesive composition which comprises: (1) blending together 100 parts of a vulcanizable rubbery diene polymer, about 3–15 parts of an oil-soluble, heat-advancing, phenol-aldehyde resin compatible therewith, and a small amount of a sulfur-vulcanizing agent not greater than an amount equivalent to about 1.5 parts of dipentamethylene thiuram tetrasulfide; (2) heating the blend, in the absence of concurrent mixing, to completion of the reaction; (3) masticating the mixture in the presence of an amount of a tackifier resin sufficient to cause the batch to cling together for effective mastication and within the range of about 5–40 parts, until the mass is smoothly dispersible in heptane; and (4) dispersing the mass, together with additional tackifier resin to a total of about 45–65 parts, in a volatile liquid organic vehicle.

8. A stable, heat-resistant, pressure-sensitive tape adhesive composition prepared in accordance with the method of claim 7.

9. A pressure-sensitive adhesive tape comprising a thin flexible backing and, firmly adherently bonded thereto, a coating of a stable, heat-resistant adhesive composition prepared in accordance with the method of claim 7.

References Cited in the file of this patent

UNITED STATES PATENTS 2,559,990    Oace et al. _____ July 10, 1951